Aug. 17, 1943.    V. IMPERATO    2,326,948
POWER TRANSMISSION APPARATUS
Filed Feb. 6, 1941    3 Sheets-Sheet 1

INVENTOR
VINCENT IMPERATO
BY
Richards & Geier
ATTORNEYS

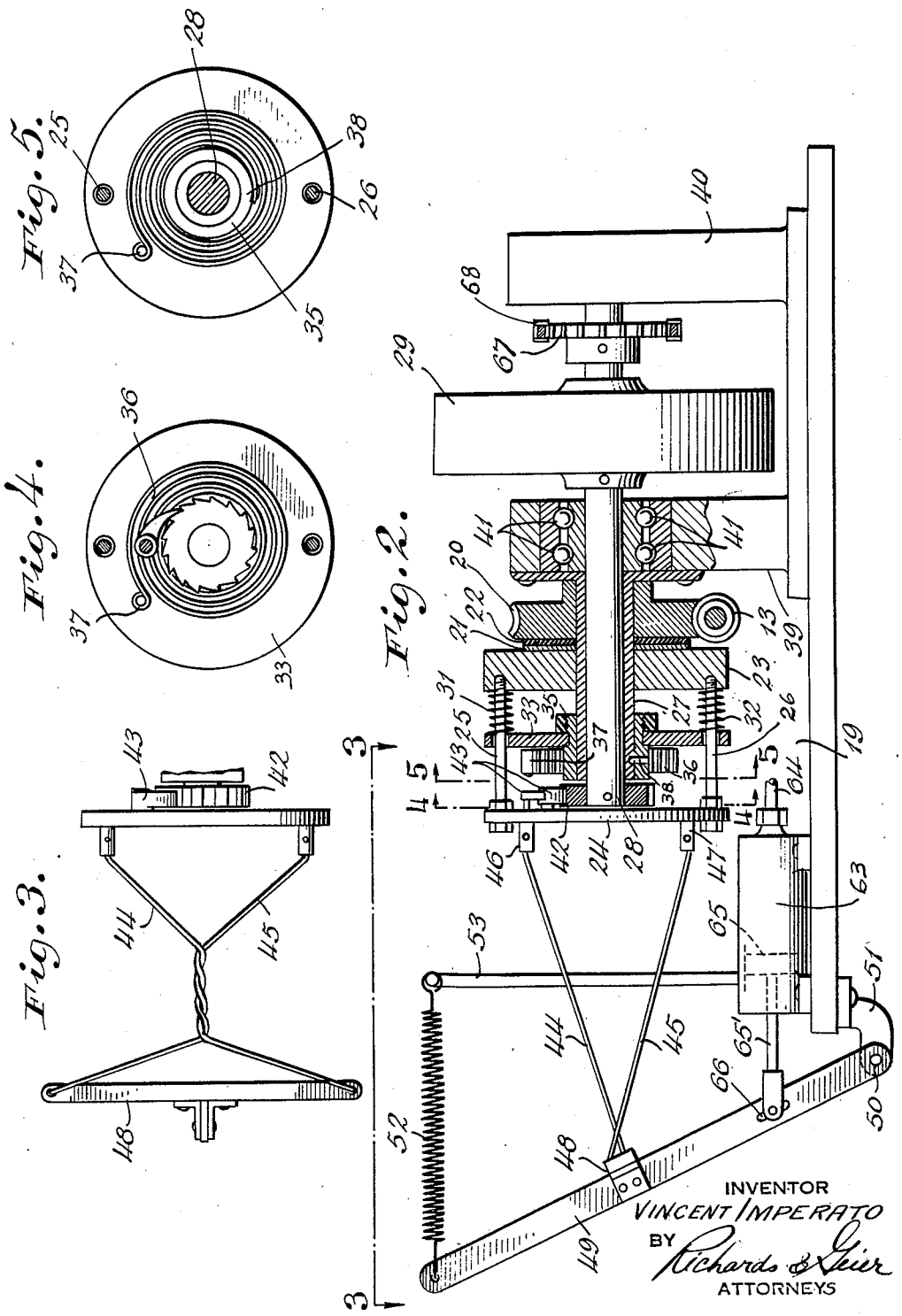

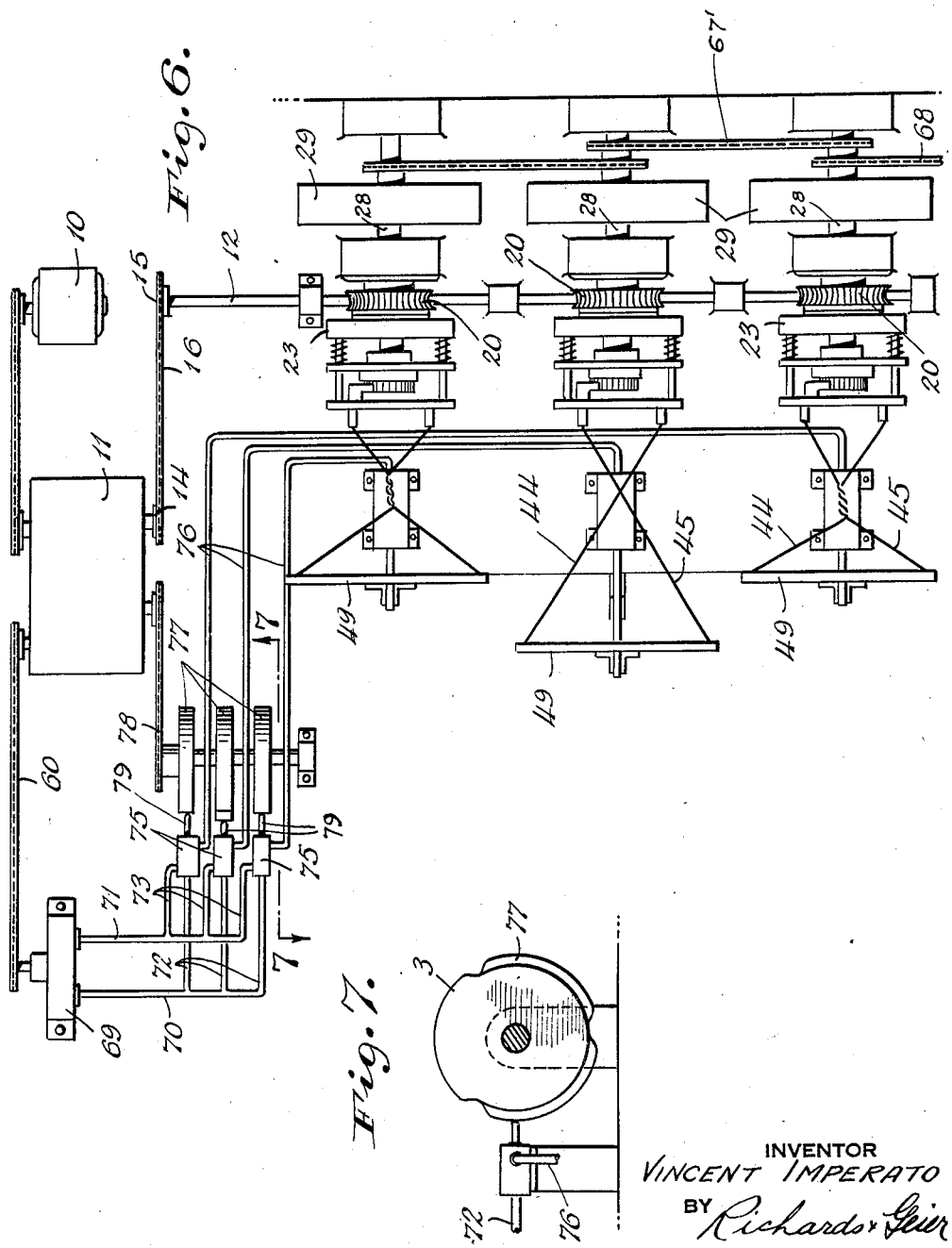

Patented Aug. 17, 1943

2,326,948

UNITED STATES PATENT OFFICE 2,326,948

POWER TRANSMISSION APPARATUS

Vincent Imperato, Garfield, N. J.

Application February 6, 1941, Serial No. 377,677

3 Claims. (Cl. 185—11)

This invention relates to a power-transmitting apparatus and the like.

One of the principal objects of the invention is to provide an apparatus in which energy may be stored and then released in successive impulses to impart motion to a driven device.

Other objects and advantages inherent in the invention will become apparent as the specification proceeds and when taken in conjunction with the accompanying drawings.

Figure 2 is a detail view of one energy-storing and energy releasing unit, partly in section.

Figure 3 is a plan view of the energy-storing mechanism taken along the line 3—3 of Figure 2.

Figure 4 is a section taken along the line 4—4 of Figure 2.

Figure 5 is a section taken along the line 5—5 of Figure 2.

Figure 6 is a schematic view of a modification showing a plurality of driving units.

Figure 7 is a section taken along the line 7—7 of Figure 6.

Throughout the drawings, the same reference characters serve to indicate the same or similar parts.

Figure 1:
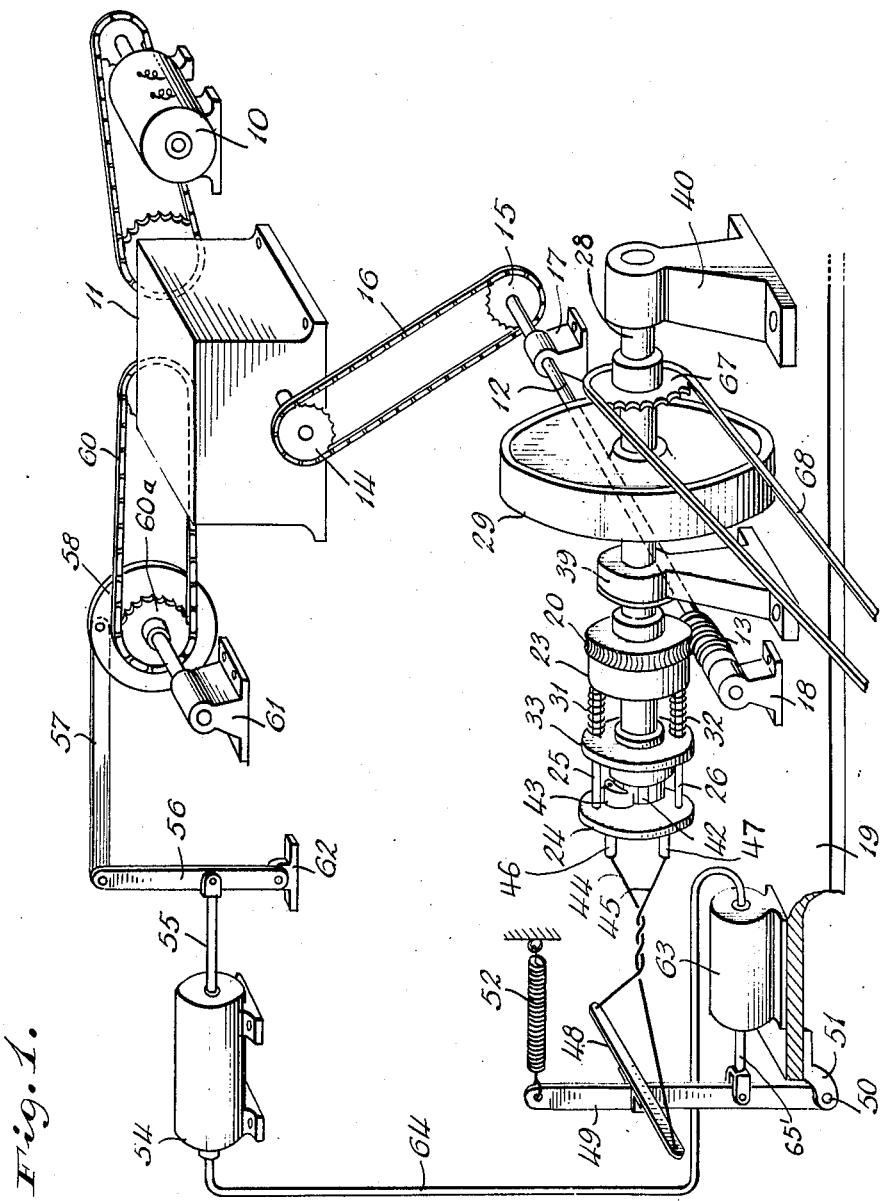
Figure 1 is a schematic view in perspective of a power-transmitting apparatus according to the invention.

It will be understood that this disclosure is made by way of example only and not by way of limitation. On the other hand, the invention might find expression in a number of ways within the scope of the appended claims.

In terms of broad inclusion, the invention contemplates the successive tensioning and releasing of resilient mechanical means for imparting successive impulses to a driven mechanism.

Referring in greater detail to the drawings, the apparatus comprises a motor 10, which, through a series of reduction gears in the gear box 11, drives the worm shaft 12 and the worm 13 by the aid of sprockets 14 and 15 and the sprocket chain 16.

The worm shaft 12 is journaled to the bearing blocks 17 and 18, bolted or otherwise mounted on the base plate 19. The worm 13 drives the worm wheel 20 which, by means of friction discs 21 and 22, clutch the slidable clutch disc 23. The clutch disc 23 is, in turn, connected to the driving disc 24 by means of bolts 25 and 26.

The worm wheel 20, as well as the clutch disc 23, are rotatable about the stationary sleeve 27. The clutch disc 23, in addition, is slidable on the sleeve against the tension of the springs 31 and 32 interposed between the clutch disc and the abutment disc 33.

The abutment disc 33 is perforated to accommodate the bolts 25 and 26 interconnecting the clutch disc 23 and the drive disc 24. The abutment disc 33 is rotatable about the flange or hub 35 firmly mounted on the sleeve 27. The abutment disc 33 is provided with a booster spring 36, one end of which is connected at 37 to the abutment disc 33, the other end being connected to the stationary flange and sleeve by means of the pin 38.

The drive shaft 28 is journalled in bearing blocks 39 and 40 which are bolted or otherwise mounted on the base plate 19. The bearing blocks may be provided with ball bearings 41. A ratchet 42 is keyed on one end of the drive shaft 28 and the drive disc 24 is provided with a co-acting pawl 43.

The energy-storing mechanism, as shown by way of example in the drawings, consists of a pair of cables 44 and 45 attached respectively to the brackets 46 and 47 on the drive disc 24 and to the opposite ends of the bar 48. The bar 48 is, in turn, firmly bracketed on the lever 49 pivoted at 50 to a bracket 51 connected to the base plate 19.

The lever 49 may be swung in a direction away from the driving unit against the tension of the spring 52 interposed between one end of the lever and a stanchion 53 extending from the base plate 19. The lever 49 is actuated through the force of an hydraulic system comprising a master cylinder 54 having a piston rod 55 actuated by the levers 56 and 57.

The lever 57 is pivoted to the disc 58, which latter is rotated by the motor 10 through the various reduction gears in the gear box 11 by means of the sprocket 60a and the sprocket chain 60.

The disc 58 is suitably mounted in the bearing block 61. The lever 56 is pivoted at opposite ends to the bracket 62 and the lever 57. The compression of the fluid in the master cylinder 54 is communicated to the lever-actuating cylinder 63 through the conduit 64.

The piston 65 in the cylinder 64 is provided with a piston rod 65' pivoted to the lever 49 in the slot 66.

The operation of the device is as follows:

When the motor 10 is started, the worm 13 will be rotated to turn the worm wheel 20. By reason of the provision of the clutch mechanism, the rotation of the worm wheel will also result in the rotation of the clutch disc 23 and the drive disc 24. This rotative movement, in turn, results in twisting the cables 44 and 45, as shown in Figures 1 and 3 of the drawings. This turning movement of the driving unit will also result in tensioning of the booster spring 36.

The hydraulic system is so timed that the compression will commence substantially simultaneously with the winding operation of the cables 44 and 45. The compression stroke in the cylinders 54 and 63 will, in turn, push the lever 49 outward, as shown in Figure 2 of the drawings, against the tension of the spring 52. This operation will, in turn, exert a pulling force on the drive disc 24 and the slidable clutch disc 23 against the tension of the springs 31 and 32. The tension of the springs 31 and 32 is so selected that the clutch disc will not be disengaged from the worm wheel until the cables 44 and 45 have been wound to their limit and the lever 49 pushed back to the limit of its tensioning stroke.

As soon as the clutch has become disengaged from the worm wheel 20, the energy stored in the wound cables 44 and 45 will become released and give a rotary impulse to the drive disc 24 and the clutch disc 23 in the opposite direction. By reason of the provision of the pawl and ratchet device 43 and 42, this rotary motion will rotate the drive shaft 28 and the fly wheel 29. This rotary motion may be taken off by means of a sprocket 67 mounted on the drive shaft 28 and transmitted to various mechanisms to be driven by means of the sprocket chain 68.

The booster spring 36 serves to accelerate the releasing of the energy stored in the wound spring.

The hydraulic system is so timed that the return stroke of the lever 49 will commence with the release of the energy stored in the wound cables 44 and 45. It will be understood that this timing may be regulated by means of the disc 58. Figure 1 shows the position of the device as the compression stroke is about to commence.

It will be understood that a plurality of energy-storing mechanisms and driving units, as described, may be provided and timed to operate in successive order. In this manner, successive impulses may be continuously imparted to the fly wheel 29. Such a system is illustrated in Figure 6. Each drive unit is provided with a drive shaft 28 which may be provided with separate fly wheels 29. As shown in Figure 6, the drive shaft and the fly wheels are interconnected by means of sprocket wheels and sprocket chains 67' and 68. It will be understood, of course, that the additional fly wheels may be eliminated entirely and simply the drive shaft in the different units connected to a single fly wheel.

Figure 6 also shows a modification of the timing system. Instead of a master cylinder, an oil pump 69 is provided having a circuit comprised of conduits 70 and 71 and bi-conduits 72 and 73 which lead to a plurality of three-way valves 75. A separate three-way valve is provided for each drive unit to which it is connected by conduits 76, the three-way valves are actuated by the cams 77 which are driven by the motor 10 through the gears in the gear box 11 and the belt 78. The three-way valves are of conventional construction and may be actuated by pins 79 riding on the cam 77. It will be understood that the cams are so arranged that the driving units will be actuated successively and that the energy-storing stroke and the release stroke of the levers 49 are so timed that the latter will operate in the manner heretofore described.

What is claimed is:

1. In an apparatus for storing and transmitting power, a continually-operating motor, a driven element, means connected with said motor for actuating said driven element, an energy-storing mechanism, a clutch interposed between said energy-storing mechanism and said driven element and adapted to connect said driven element with said energy-storing mechanism to store energy therein, and means actuated by said motor and disengaging said clutch to cause said energy-storing mechanism to give up energy stored therein and transmit it to a device to be driven.

2. In an apparatus for storing and transmitting power, a continually-operating motor, a driven element, means connected with said motor for actuating said driven element, a winding- and unwinding mechanism, a clutch interposed between said winding- and unwinding mechanism and said driven element and adapted to connect said driven element with said winding- and unwinding mechanism to wind the same, and means actuated by said motor and disengaging said clutch to cause said winding- and unwinding mechanism to unwind itself and transmit it to a device to be driven.

3. In an apparatus for storing and transmitting power, a continually-operating motor, a disc, means connected with said motor for rotating said disc, a winding- and unwinding mechanism, a clutch interposed between said winding- and unwinding mechanism and said disc and adapted to connect said disc with said winding- and unwinding mechanism to wind the same and a hydraulic mechanism operated by said motor and disengaging said clutch to cause said winding- and unwinding mechanism to unwind itself and transmit it to a device to be driven.

VINCENT IMPERATO.